US011881795B2

(12) United States Patent
Sato

(10) Patent No.: US 11,881,795 B2
(45) Date of Patent: Jan. 23, 2024

(54) METHOD OF CONTROLLING PIEZOELECTRIC DRIVING APPARATUS, METHOD OF CONTROLLING ROBOT, AND ROBOT

(71) Applicant: SEIKO EPSON CORPORATION, Tokyo (JP)

(72) Inventor: Ryuichi Sato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/980,557

(22) Filed: Nov. 4, 2022

(65) Prior Publication Data
US 2023/0144997 A1    May 11, 2023

(30) Foreign Application Priority Data
Nov. 5, 2021    (JP) ................. 2021-181063

(51) Int. Cl.
*H02N 2/14* (2006.01)
*H02N 2/02* (2006.01)
*B25J 9/12* (2006.01)
*H02N 2/10* (2006.01)
*H02N 2/06* (2006.01)

(52) U.S. Cl.
CPC ............. *H02N 2/142* (2013.01); *B25J 9/12* (2013.01); *H02N 2/026* (2013.01); *H02N 2/062* (2013.01); *H02N 2/103* (2013.01)

(58) Field of Classification Search
CPC ........ H02N 2/142; H02N 2/026; H02N 2/062; H02N 2/103; H02N 2/003; H02N 2/0075; B25J 9/12
See application file for complete search history.

(56) References Cited

U.S. PATENT DOCUMENTS

2008/0164783 A1    7/2008  Okada
2011/0006640 A1*   1/2011  Haussecker ............ H02N 2/002
                                                310/323.16

FOREIGN PATENT DOCUMENTS

JP            2008172853 A    7/2008

* cited by examiner

*Primary Examiner* — Emily P Pham
(74) *Attorney, Agent, or Firm* — Gang Yu

(57) ABSTRACT

A method of controlling a piezoelectric driving apparatus including a vibration section that has a piezoelectric element and a transmission section that transmits vibration of the vibration section to a driven body, and, by energization of the piezoelectric element, vibrates the vibration section in a combination of longitudinal vibration and bending vibration to cause the transmission section to perform an elliptical motion and to move the driven body by the elliptical motion, the method of controlling the piezoelectric driving apparatus including switching, according to an external force received by the driven body, a drive algorithm of the piezoelectric driving apparatus between a first drive mode in which a separation amplitude, which is an amplitude of the longitudinal vibration, is changed while a feed amplitude, which is an amplitude of the bending vibration, is constant and a second drive mode in which both the feed amplitude and the separation amplitude are changed.

11 Claims, 9 Drawing Sheets

METHOD OF CONTROLLING PIEZOELECTRIC DRIVING APPARATUS, METHOD OF CONTROLLING ROBOT, AND ROBOT

The present application is based on, and claims priority from JP Application Serial Number 2021-181063, filed Nov. 5, 2021, the disclosure of which is hereby incorporated by reference herein in its entirety.

BACKGROUND

1. Technical Field

The present disclosure relates to a method of controlling a piezoelectric driving apparatus, a method of controlling a robot, and a robot.

2. Related Art

For example, JP-A 2008 172853 describes a driving method of an ultrasonic actuator (piezoelectric driving apparatus) that causes a friction contact portion to generate substantially elliptical vibration by generating longitudinal vibration and bending vibration, and that moves a driven body using the friction force of the elliptical vibration as a thrust force. The driving method of the ultrasonic actuator described in the JP-A-2008-172853 is characterized in that the bending vibration is excited after the longitudinal vibration is excited at the time of activation for the purpose of suppressing a drop of the driven body due to the influence of gravity.

However, although the drop of the driven body due to the influence of gravity may be suppressed by the driving method of the ultrasonic actuator described in JP-A-2008-172853, there is a problem in that it is difficult to control the minute movement of the driven body depending on the magnitude and direction of external forces applied to the driven body such as gravity.

SUMMARY

A method of the present disclosure for controlling a piezoelectric driving apparatus including a vibration section that has a piezoelectric element and a transmission section that transmits vibration of the vibration section to a driven body, and, by energization of the piezoelectric element, vibrates the vibration section in a combination of longitudinal vibration and bending vibration to cause the transmission section to perform an elliptical motion and to move the driven body by the elliptical motion, the method of controlling the piezoelectric driving apparatus comprising switching, according to an external force received by the driven body, a drive algorithm of the piezoelectric driving apparatus between a first drive mode in which a separation amplitude, which is an amplitude of the longitudinal vibration, is changed while a feed amplitude, which is an amplitude of the bending vibration, is constant and a second drive mode in which both the feed amplitude and the separation amplitude are changed.

A method of the present disclosure for controlling a robot, the robot including a piezoelectric driving apparatus including a vibration section that has a piezoelectric element and a transmission section that transmits vibration of the vibration section to a driven body, and, by energization of the piezoelectric element, vibrates the vibration section in a combination of longitudinal vibration and bending vibration to cause the transmission section to perform an elliptical motion and to move the driven body by the elliptical motion and a movable section driven by the piezoelectric driving apparatus, the method of controlling the robot comprising switching, according to an external force received by the driven body, a drive algorithm of the piezoelectric driving apparatus between a first drive mode in which a separation amplitude, which is an amplitude of the longitudinal vibration, is changed while a feed amplitude, which is an amplitude of the bending vibration, is constant and a second drive mode in which both the feed amplitude and the separation amplitude are changed.

A robot of the present disclosure including a piezoelectric driving apparatus including a vibration section that has a piezoelectric element and a transmission section that transmits vibration of the vibration section to a driven body, and, by energization of the piezoelectric element, vibrates the vibration section in a combination of longitudinal vibration and bending vibration to cause the transmission section to perform an elliptical motion and to move the driven body by the elliptical motion, a movable section driven by the piezoelectric driving apparatus, and a controller that controls drive of the piezoelectric driving apparatus, wherein the controller switches, according to an external force received by the driven body, a drive algorithm of the piezoelectric driving apparatus between a first drive mode in which a separation amplitude, which is an amplitude of the longitudinal vibration, is changed while a feed amplitude, which is an amplitude of the bending vibration, is constant and a second drive mode in which both the feed amplitude and the separation amplitude are changed

DESCRIPTION OF EMBODIMENTS

Hereinafter, a method of controlling a piezoelectric driving apparatus, a method of controlling a robot, and a robot according to the present disclosure will be described in detail based on embodiments illustrated in the accompanying drawings.

First Embodiment

Figure 1:
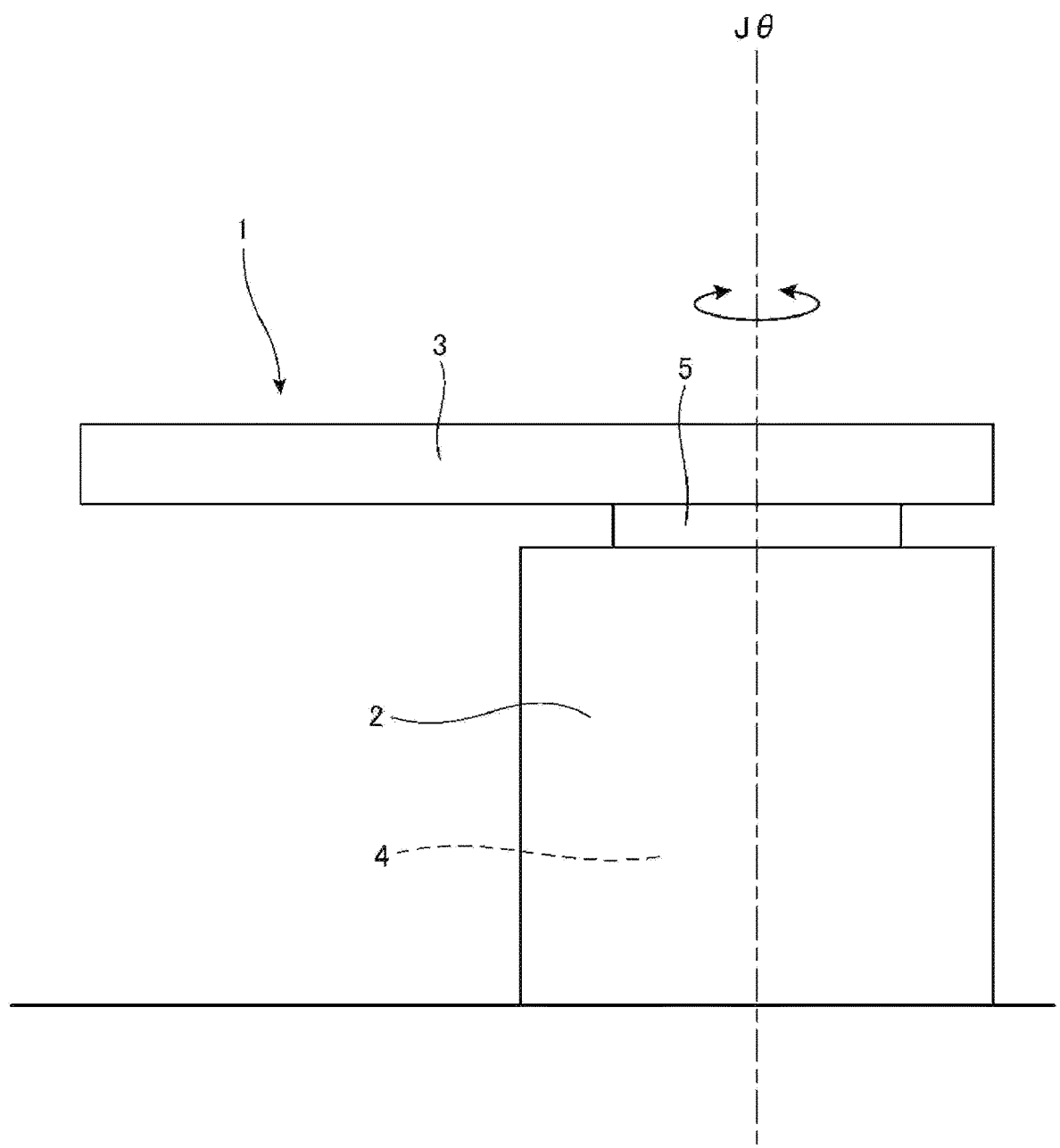
FIG. 1 is a diagram showing a robot according to a first embodiment.
Figure 2:
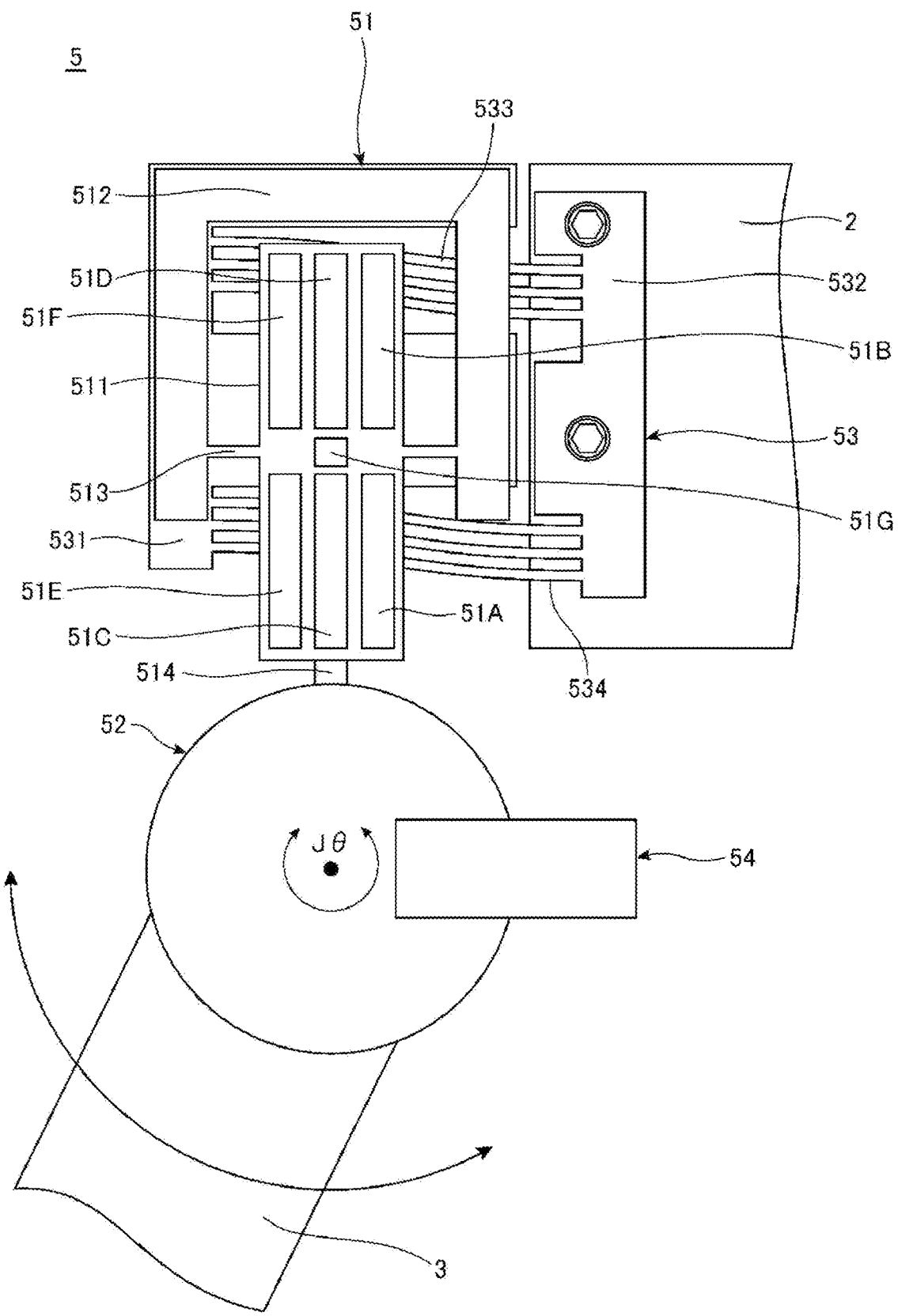
FIG. 2 is a diagram showing a piezoelectric driving apparatus.
Figure 3:
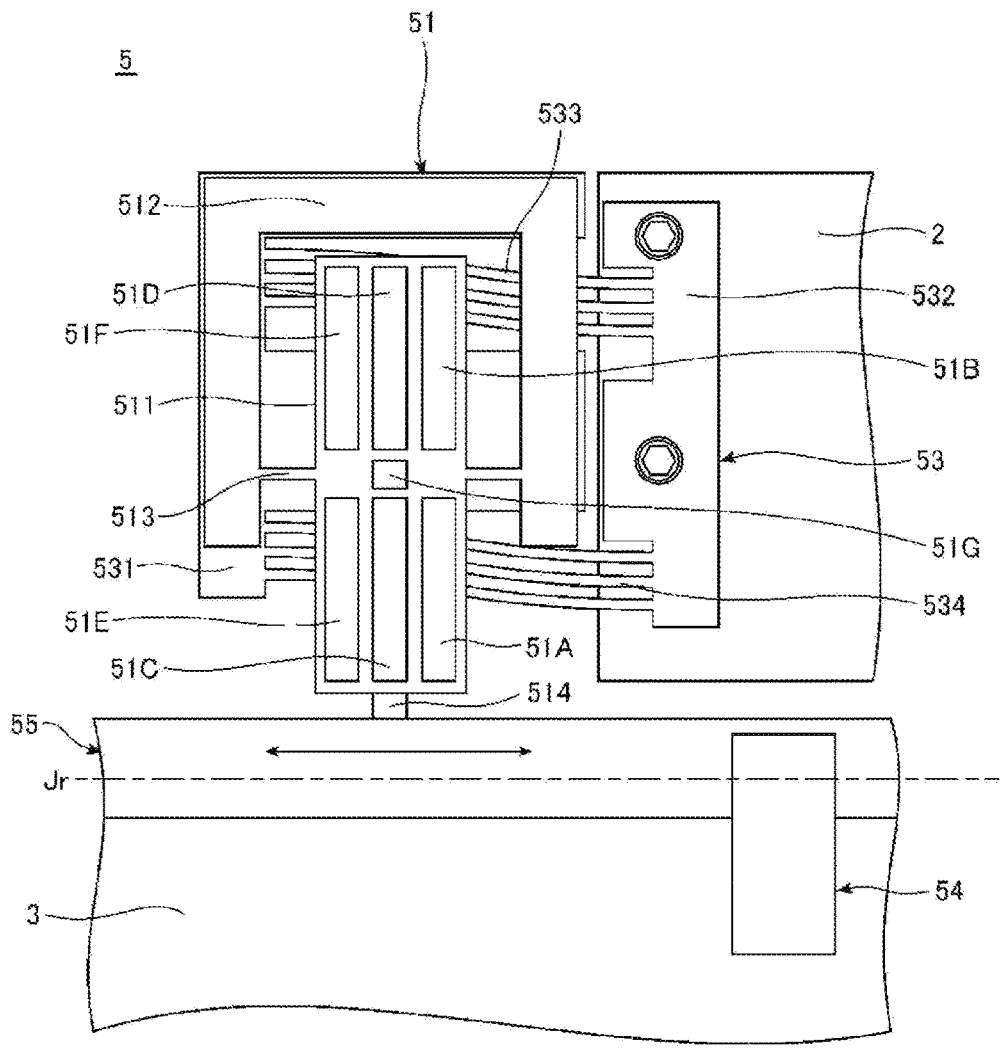
FIG. 3 is a diagram showing a modification of the piezoelectric driving apparatus.
Figure 4:
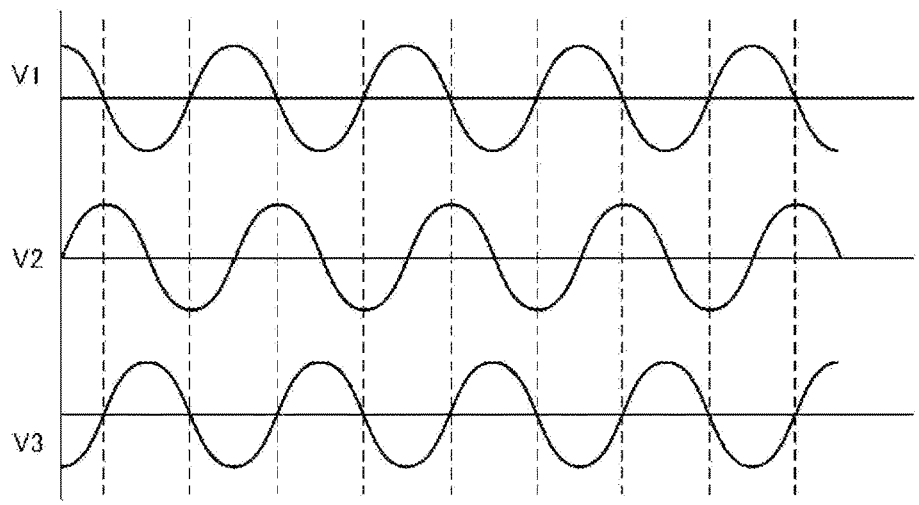
FIG. 4 is a diagram showing a drive signal of the piezoelectric actuator.
Figure 5:
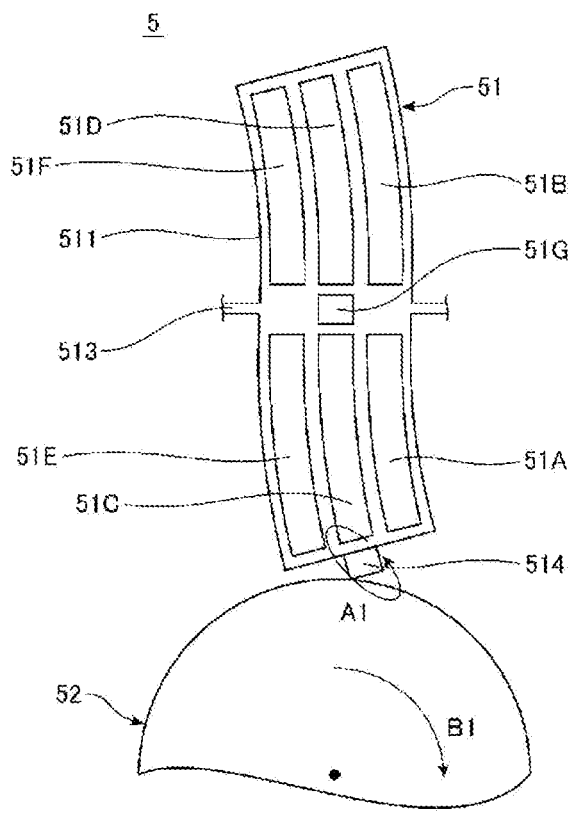
FIG. 5 is a diagram showing a vibration state of the piezoelectric actuator.
Figure 6:
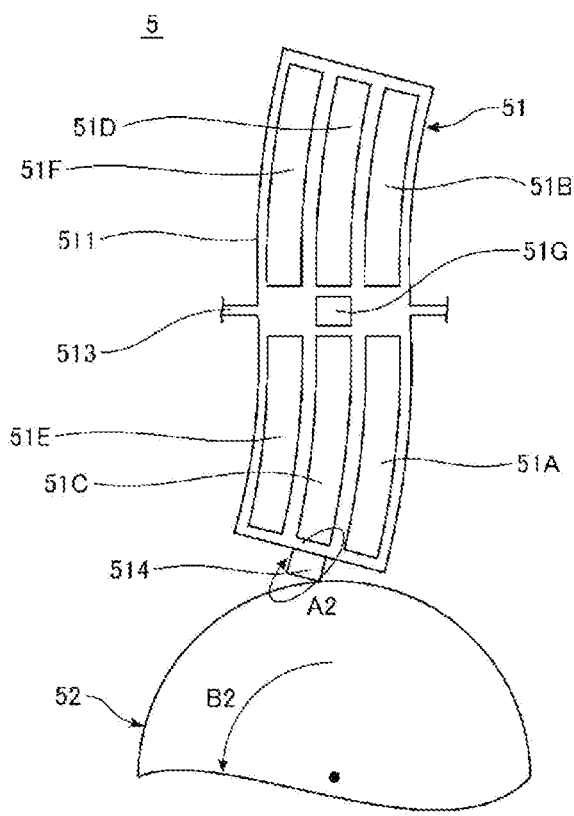
FIG. 6 is a diagram showing a vibration state of the piezoelectric actuator.
Figure 7:
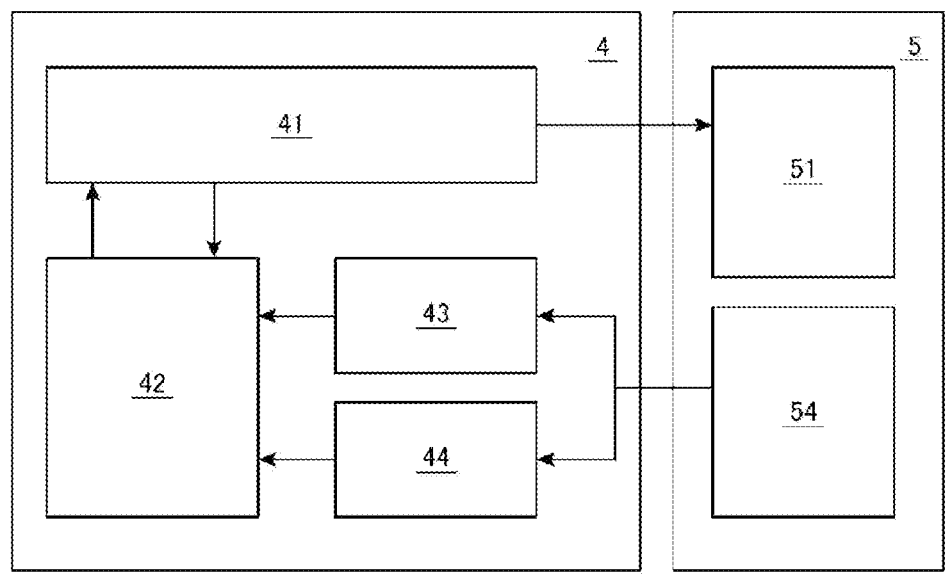
FIG. 7 is a block diagram showing a configuration of a controller.
Figure 8:
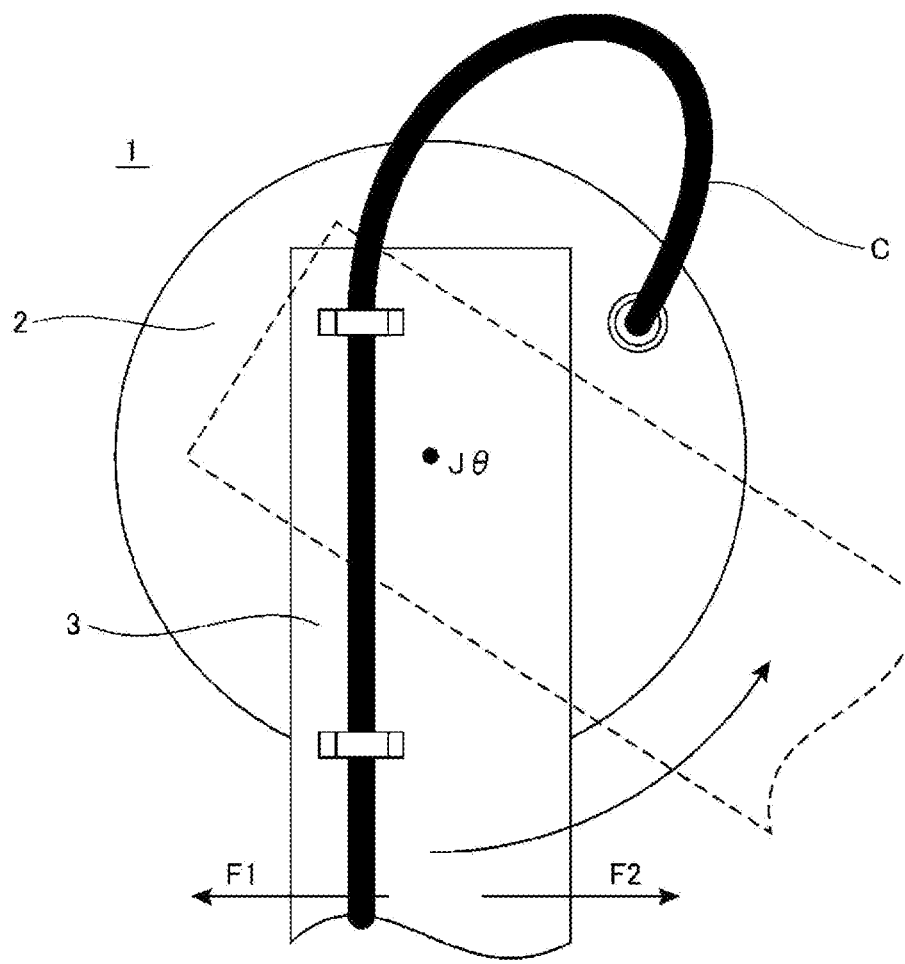
FIG. 8 is a diagram showing an example in which the robot is affected by an external force.
Figure 9:
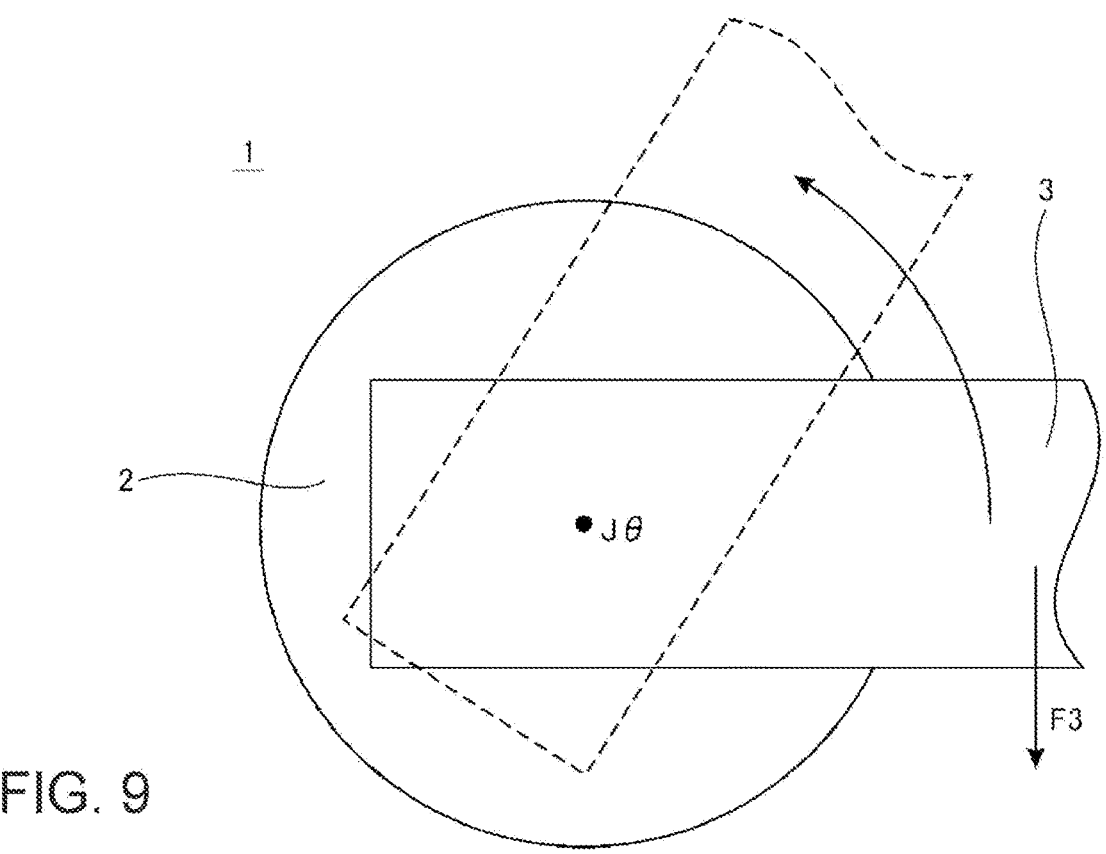
FIG. 9 is a diagram showing an example in which the robot is affected by an external force.
Figure 10:
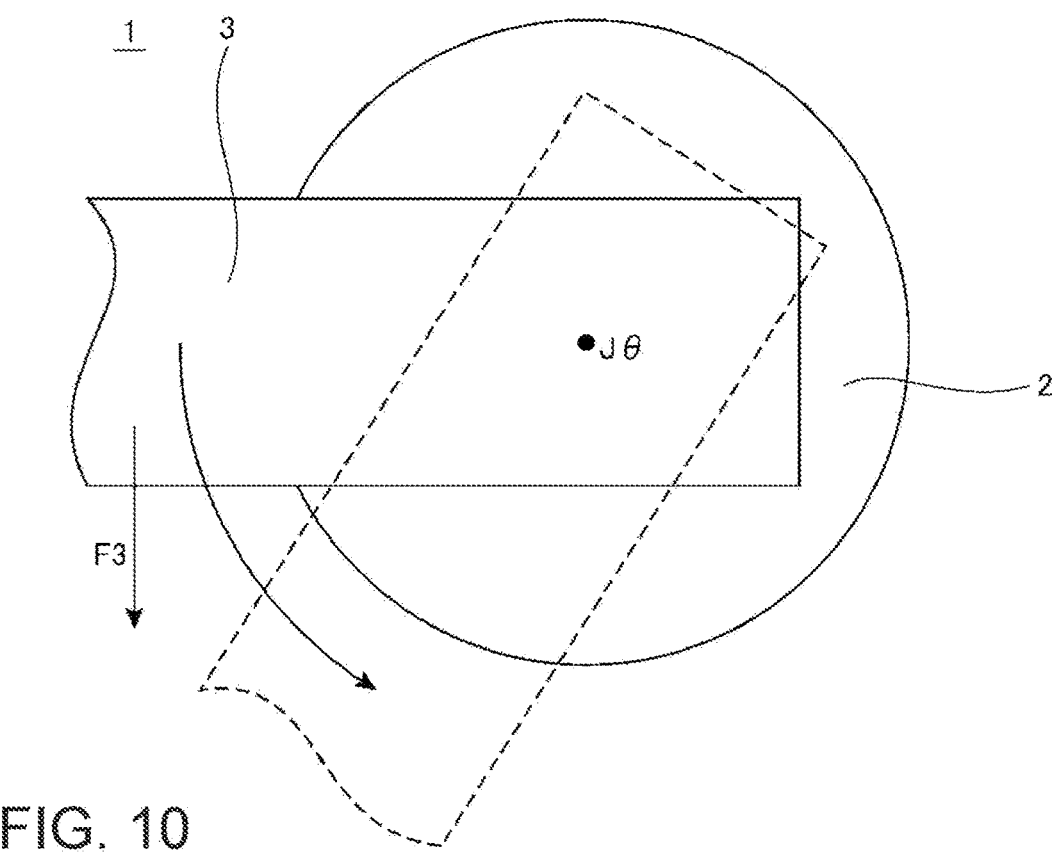
FIG. 10 is a diagram showing an example in which the robot is affected by an external force.
Figure 11:
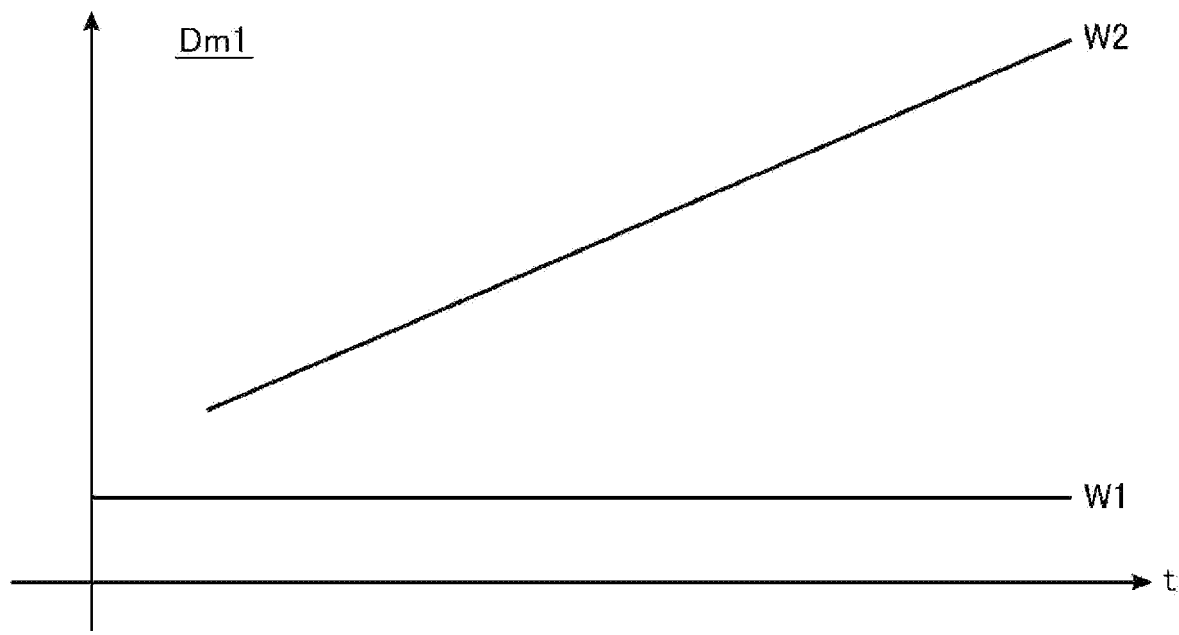
FIG. 11 is a diagram showing a first drive mode.
Figure 12:
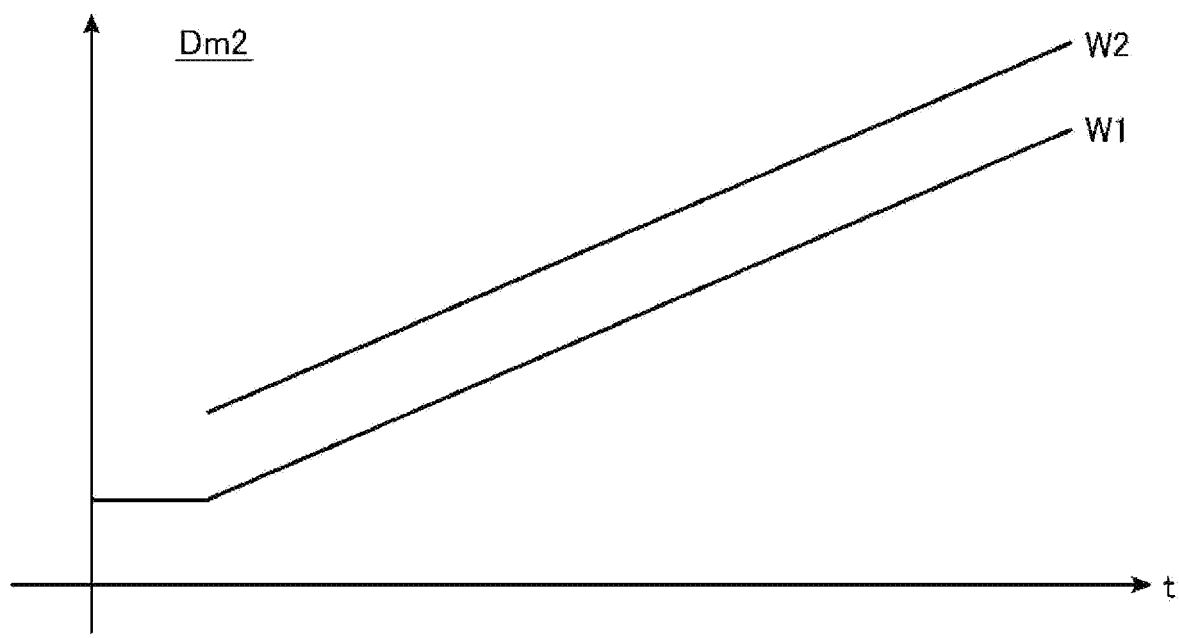
FIG. 12 is a diagram showing a second drive mode.
Figure 13:
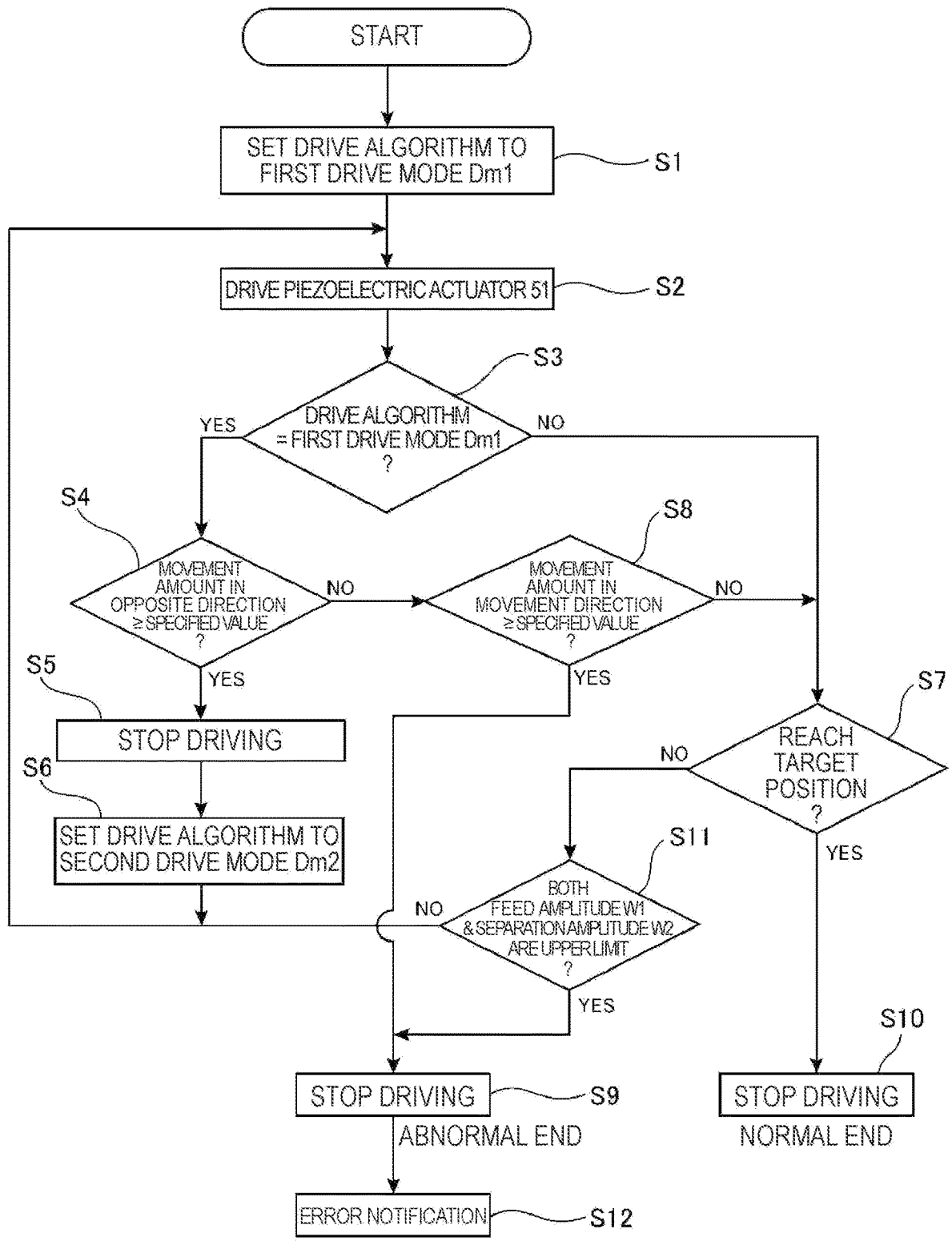
FIG. 13 is a flowchart showing a method of controlling the piezoelectric driving apparatus.

FIG. 1 is a diagram showing a robot according to a first embodiment. FIG. 2 is a diagram showing a piezoelectric driving apparatus. FIG. 3 is a diagram showing a modification of the piezoelectric driving apparatus. FIG. 4 is a diagram showing drive signals of the piezoelectric actuator. FIG. 5 and FIG. 6 are diagrams showing vibration states of the piezoelectric actuator. FIG. 7 is a block diagram showing a configuration of a controller. FIGS. 8 to 10 are diagrams showing examples in which the robot is affected by an external force. FIG. 11 is a diagram showing a first drive mode. FIG. 12 is a diagram showing a second drive mode. FIG. 13 is a flowchart showing a method of controlling the piezoelectric driving apparatus.

The robot 1 shown in FIG. 1 has a first member 2, a second member 3 as a movable section, a piezoelectric driving apparatus 5 for pivoting the second member 3 about a pivot axis JO with respect to the first member 2, and a controller 4 for controlling the drive of the piezoelectric driving apparatus 5. The first member 2 and the second member 3 can be used as a part of a robotic arm as in a second and a third embodiments to be described later.

As shown in FIG. 2, the piezoelectric driving apparatus 5 includes a piezoelectric actuator 51, a rotor 52 as a driven portion that rotates around the pivot axis JO by receiving a driving force from the piezoelectric actuator 51, a biasing member 53 that presses the piezoelectric actuator 51 against the rotor 52, and an encoder 54 as a displacement amount detection sensor that detects a displacement amount of the rotor 52. The piezoelectric actuator 51 is fixed to the first member 2 via the biasing member 53, and the rotor 52 is fixed to the second member 3. Therefore, when the piezoelectric actuator 51 is driven, the second member 3 fixed to the rotor 52 rotates around the pivot axis JO with respect to the first member 2.

According to such a piezoelectric driving apparatus 5, the drive force by the piezoelectric actuator 51 is directly transmitted to the rotor 52. Therefore, a relay mechanism that relays and transmits the drive force is not needed, and the device can be simplified and miniaturized. In addition, deterioration in movement accuracy due to backlash or insufficient rigidity, which are problems in a relay mechanism such as a reduction gear, is substantially eliminated, and the robot 1 has excellent drive accuracy. In particular, the rotation type (rotary type) piezoelectric driving apparatus 5 is a suitable device for rotationally moving the second member 3.

However, the piezoelectric driving apparatus 5 is not limited to a rotation type, and may be, for example, a linear motion type (linear type) as shown in FIG. 3. In the shown piezoelectric driving apparatus 5, a slider 55 movable along a linear motion axis Jr is used as the driven body, and the slider 55 is fixed to the second member 3. Therefore, when the piezoelectric actuator 51 is driven, the second member 3 fixed to the slider 55 moves along the linear motion axis Jr with respect to the first member 2.

In this way, the linear motion type (linear type) piezoelectric driving apparatus 5 is a suitable device for linearly moving the second member 3.

The displacement amount detection sensor is not particularly limited as long as it can perform its function, and for example, various inertial sensors such as an acceleration sensor and an angular velocity sensor, a laser displacement meter, an image measuring device, and the like can also be used.

As shown in FIG. 2, the piezoelectric actuator 51 includes a vibration section 511, a support section 512 that supports the vibration section 511, a beam section 513 that connects the vibration section 511 and the support section 512 together, and a protrusion-like transmission section 514 that is disposed at a tip end portion of the vibration section 511 and that transmits the vibration of the vibration section 511 to the rotor 52.

The vibration section 511 has a plate shape, and has a rectangular shape having a length in the vertical direction of the paper surface. The vibration section 511 includes piezoelectric elements 51A to 51F for driving and a piezoelectric element 51G for detecting the vibration of the vibration section 511. Piezoelectric elements 51C and 51D are arranged side by side in the longitudinal direction in a central portion of the vibration section 511. On one side of the piezoelectric elements 51C and 51D, piezoelectric elements 51A and 51B are arranged side by side in the longitudinal direction, and on the other side, piezoelectric elements 51E and 51F are arranged side by side in the longitudinal direction. Each of the piezoelectric elements 51A to 51F expands and contracts in the longitudinal direction of the vibration section 511 when energized.

The piezoelectric element 51G for detection is arranged between the piezoelectric elements 51C and 51D. The piezoelectric element 51G receives external force according to the vibration of the vibration section 511 and outputs a detection signal according to the received external force. Therefore, the piezoelectric driving apparatus 5 can detect the vibration state of the vibration section 511 based on the detection signal output from the piezoelectric elements 51G.

The transmission section 514 is provided at a tip portion of the vibration section 511, and a tip thereof is in contact with the rotor 52. Therefore, the vibration of the vibration section 511 is transmitted to the rotor 52 via the transmission section 514. The support section 512 is a portion that supports the vibration section 511, and has a U-shape that surrounds both sides and the base end side of the vibration section 511. In addition, the beam section 513 connects the vibration section 511 and the support section 512 in a state that allows the vibration section 511 to vibrate.

The biasing member 53 biases the piezoelectric actuator 51 toward the rotor 52 and presses the transmission section 514 against the rotor 52. Accordingly, the vibration of the vibration section 511 is efficiently transmitted to the rotor 52 via the transmission section 514. In addition, when the piezoelectric driving apparatus 5 is not driven, a brake is applied to the rotor 52, so that it is possible to prevent the rotor 52 from unintentionally rotating. The biasing member 53 includes a holding section 531 that holds the support section 512, a base section 532 that is fixed to the first member 2, and a group of springs 533 and 534 that connects the holding section 531 and the base section 532. The biasing member 53 is fixed in such a state that the group of springs 533 and 534 is deformed, and presses the piezoelectric actuator 51 against the rotor 52 by utilizing the restoring force of the group of springs 533 and 534.

Such a piezoelectric driving apparatus 5 is driven as follows. For example, when the drive signal V1 shown in FIG. 4 is applied to the piezoelectric elements 51A and 51F, the drive signal V2 is applied to the piezoelectric elements 51C and 51D, and the drive signal V3 is applied to the piezoelectric elements 51B and 51E, then, as shown in FIG. 5, the vibration section 511 performs bending vibration, in which the vibration section bends in the short-side direction, while performing longitudinal vibration, in which the vibration section expands and contracts in the longitudinal direction, and these vibrations combine so that the tip of the transmission section 514 performs elliptical motion, in which the tip draws an elliptical trajectory counterclockwise as indicated by an arrow A1. As a result, the rotor 52 is moved and rotated clockwise as indicated by an arrow B1. On the other hand, when the drive signals V1 and V3 are switched, that is, when the drive signal V1 is applied to the piezoelectric elements 51B and 51E and the drive signal V3 is applied to the piezoelectric elements 51A and 51F, then, as shown in FIG. 6, the tip of the transmission section 514 performs an elliptical motion in which the tip draws an elliptical trajectory clockwise as indicated by the arrow A2, and the rotor 52 rotates in the counterclockwise as indicated by the arrow B2.

Of the longitudinal vibration and the bending vibration of the vibration section 511, which are the basis of the elliptical motion of the transmission section 514, the longitudinal vibration is excited by applying the drive signal V2 to the piezoelectric elements 51C and 51D, and the bending vibration is excited by applying the drive signals V1 and V3 to the piezoelectric elements 51A, 51B, 51E and 51F.

The controller 4 is constituted by, for example, a computer, and includes a processor that processes information, a memory that is communicably connected to the processor, and an external interface. In addition, the memory stores programs executable by the processor, and the processor reads and executes the programs stored in the memory. The controller 4 receives a command from a host computer (not shown) and controls the drive of the piezoelectric driving apparatus 5 so that the second member 3 moves to a target position based on the command.

As shown in FIG. 7, the controller 4 includes a drive signal generation section 41, a drive algorithm selection section 42, a movement amount detection section 43 that detects a movement amount of the second member 3, and a movement direction detection section 44 that detects a movement direction of the second member 3.

The movement amount detection section 43 detects the movement amount of the second member 3, that is, the rotation amount about the pivot axis JO, based on an output signal of the encoder 54. The movement direction detection section 44 detects a movement direction of the second member 3, that is, a rotation direction (arrows B1/B2) about the pivot axis JO, based on an output signal of the encoder 54.

The drive algorithm selection section 42 selects a drive algorithm for the piezoelectric actuator 51 based on the detection results of the movement amount detection section 43 and the movement direction detection section 44. The drive algorithm is selected from a first mode Dm1 and a second drive mode Dm2 as described below. The drive signal generation section 41 generates the drive signals V1, V2, and V3 based on the drive algorithm selected by the drive algorithm selection section 42 and a command from a host computer (not shown), and applies the generated drive signals V1, V2, and V3 to the piezoelectric actuator 51. According to such a method, since the actual rotation amount and rotation direction detected by the encoder 54 are fed back, the movement of the second member 3 can be accurately controlled.

The configuration of the robot 1 has been briefly described above. Next, a method of controlling the piezoelectric driving apparatus 5 will be described. In a method of controlling the piezoelectric driving apparatus 5, the drive algorithm is switched according to the external force F received by the robot 1. Accordingly, it is possible to reduce the influence of the external force F as much as possible and accurately control minute movement of the robot 1. The external force F is not particularly limited, and examples thereof include a force F1 applied to the second member 3 in a direction opposite to the rotation direction, a force F2 applied in the same direction as the rotation direction, and a force F3, which is gravity, applied to the second member 3 in a vertical direction.

FIG. 8 shows an example of being affected by forces F1 and F2. In FIG. 8, the pivot axis Je extends along the vertical direction. Further, a wiring C for power supply to the second member 3, communication, and the like is routed from the first member 2 to the second member 3. Therefore, depending on the posture of the second member 3, a force F1 or a force F2, which are restoring forces (forces to return to a natural state) of the wiring C, is generated in the second member 3 due to deformation, torsion, or the like of the wiring C, and the forces F1 and F2 may affect the rotation of the second member 3. Specifically, since the force F1 opposes the drive force of the piezoelectric driving apparatus 5, the second member 3 may move to the opposite side than the target (force F1>drive force), may remain stationary (force F1=drive force), or the movement amount may be less than the target (force F1<drive force). On the other hand, when the force F2 is added to the drive force of the piezoelectric driving apparatus 5, the movement amount of the second member 3 may become larger than the target. As described above, when the force F1 or F2 is applied, the rotational characteristic of the second member 3 varies, and it becomes difficult to accurately perform minute movement control of the second member 3.

FIGS. 9 and 10 show an example of being affected by the force F3. In FIGS. 9 and 10, the lower side of the paper is the lower side in the vertical direction, and the pivot axis JO is along the horizontal direction. Therefore, depending on the posture of the second member 3, the force F3 may affect the rotation of the second member 3. Specifically, in the case shown in FIG. 9, since the force F3 opposes the drive force of the piezoelectric driving apparatus 5, there are cases where the second member 3 moves to the opposite side than the target direction, remains stationary, or the movement amount becomes smaller than the target. On the other hand, in the case shown in FIG. 10, since the force F3 is added to the drive force of the piezoelectric driving apparatus 5, the movement amount of the second member 3 may be larger than the target. In this way, by the force F3 being applied, the rotational characteristics of the second member 3 varies, and it becomes difficult to accurately perform minute movement control of the second member 3.

As described above, the influence of the external force F may deteriorate the positional accuracy of the second member 3. Therefore, as described above, in the present embodiment, by switching the drive algorithm according to the external force F received by the robot 1, it is possible to reduce the influence of the external force F as much as possible and to accurately control minute movement of the robot 1.

First, a drive algorithm preset in the robot 1 will be described. In the present embodiment, the first drive mode Dm1 in which, as shown in FIG. 11, a separation amplitude W2, which is an amplitude of the longitudinal vibration, is increased while a feed amplitude W1, which is an amplitude of the bending vibration, is constant and the second drive mode Dm2 in which, as shown in FIG. 12, the separation amplitude W2 is increased while the feed amplitude W1 is increased are set as drive algorithms. In the present embodiment, the feed amplitude W1 is controlled by the voltage value of the drive signals V3 and V1, and the separation amplitude W2 is controlled by the voltage value of the drive signal V2, but the method of controlling the amplitudes W1 and W2 is not limited to this, and they may be controlled by, for example, frequencies or phases.

As will be understood from the following description, "making the feed amplitude W1 constant" means a state in which the voltage values of the drive signals V1 and V3 that control the bending vibration are made constant, and the actual amplitudes are not necessarily constant. Further, the term "constant" means not only a case where there is no variation with time but also a case where there is a slight variation or the like which may occur due to the configuration of the circuit.

In the first drive mode Dm1 shown in FIG. 11, the feed amplitude W1 is constant and only the separation amplitude W2 is gradually increased. Therefore, it is easy to generate the minimum necessary drive force. Therefore, a sudden large movement of the rotor 52 is unlikely to occur due to an excessive drive force, and the stopping accuracy is also good. On the other hand, since the drive force is increased little by little in order to generate the minimum necessary drive force, the drive force is easily affected by the external force F at the initial drive start. On the other hand, in the second drive mode Dm2 shown in FIG. 12, both the feed amplitude W1 and the separation amplitude W2 are gradually increased. Therefore, it is easily affected by the external force F immediately after the start of driving. However, after that, the drive force is less affected by the external force F than the first drive mode Dm1 since the increasing rate of the driving force is higher than that of the first driving mode Dm1. On the other hand, since the increasing pace of the feed amplitude W1 is faster than that of the first drive mode Dm1, the stopping accuracy may be deteriorated due to excessive drive force depending on the rotational speed of the rotor 52 or the like. By switching the first drive mode Dm1 and the second drive mode Dm2, which in this way have mutually different characteristics, in accordance with the external force F, receiving influence of the external force F is less likely and it is possible to perform highly accurate minute movement control.

In addition, as shown in FIGS. 11 and 12, in the first drive mode Dm1 and the second drive mode Dm2, the bending vibration is excited in the piezoelectric actuator 51, and then longitudinal vibration is excited. According to such a method, the first drive mode Dm1 and the second drive mode Dm2 are less likely to be affected by the external force F. Specifically, in a state in which the piezoelectric actuator 51 is excited to perform the bending vibration, the transmission section 514 is kept pressed against the rotor 52 by the biasing member 53. Therefore, the vibration section 511 cannot bend and deform, that is, the bending vibration does not actually occur in the vibrating portion 511. Using a car as a simile, this state is equivalent to pressing a brake pedal strongly while pressing the accelerator pedal to prevent the car from moving. In this state, when a longitudinal vibration is excited in the piezoelectric actuator 51, the transmission section 514 is separated from the rotor 52 by the longitudinal vibration, and at the same time, the suppressed bending vibration is released to generate an elliptical motion of the transmission section 514. In other words, since the time lag between the separation of the transmission section 514 from the rotor 52 and the generation of the drive force is very short (substantially zero), the rotor 52 does not become free and is hardly affected by the external force F.

On the other hand, if the longitudinal vibration is excited and then the bending vibration is excited, the transmission section 514 is separated from the rotor 52 before the force that feeds the rotor 52 is generated. In the case of car, this state is equivalent to a state in which the brake pedal is released without pressing the accelerator pedal. Therefore, the rotor 52 becomes free and moves unintentionally due to the influence of the external force F, which makes it difficult to perform minute movement control of the robot 1.

Hereinafter, the method of controlling the piezoelectric driving apparatus 5 will be described based on FIG. 13. This control is executed by the controller 4. In the method of controlling the piezoelectric driving apparatus 5, first, as step S1, the drive algorithm of the piezoelectric actuator 51 is set to the first drive mode Dm1, and as step S2, the piezoelectric actuator 51 is driven in the set drive mode, here, the first drive mode Dm1. The reason why the first drive mode Dm1 is used first is that, as described above, the minute movement accuracy of the second member 3 in the first drive mode Dm1 is higher than that in the second drive mode Dm2, and if the second member 3 can be driven without any problem in the first drive mode Dm1, the first drive mode Dm1 is better than the second drive mode Dm2.

Next, as step S3, it is determined whether the drive algorithm is the first drive mode Dm1. Here, since the drive algorithm is the first drive mode Dm1, next, as step S4, it is determined based on the output signal of the encoder 54 whether movement amount (rotation amount) in the direction opposite to the movement direction of the second member 3 is equal to or more than a specified value. As a result, it is possible to determine the influence of external force F (such as force F1 shown in FIG. 8 and force F3 shown in FIG. 9) that is in the direction opposite to the movement direction, on drive of the piezoelectric driving apparatus 5. By making a determination based on the output signal of the encoder 54, the determination becomes easy and accurate.

When the movement amount of the second member 3 in the opposite direction is equal to or greater than the specified value, the drive of the piezoelectric driving apparatus 5 is stopped as step S5. This is because external forces F (such as forces F1 or F3) applied to the robot 1 are large and it is difficult to move the second member 3 to the target position by the drive force of the first drive mode Dm1.

Next, as step S6, the drive algorithm is switched from the first drive mode Dm1 to the second drive mode Dm2, and the process returns to step S2 to drive the piezoelectric actuator 51 in the set drive mode, here, the second drive mode Dm2. That is, when the influence of the external force F is larger than the reference value, the drive algorithm is switched to the second drive mode Dm2 and drive of the piezoelectric actuator 51 is restarted. By this, since a drive force larger than that in the first drive mode Dm1 can be obtained, the possibility that the second member 3 can be moved to the target position against the external force F is increased. Next, as step S3, it is determined whether the drive algorithm is the first drive mode Dm1. Here, since the drive algorithm is the second drive mode Dm2, next, as step S7, it is determined based on the output signal of the encoder 54 whether the second member 3 has reached the target position.

Here, returning to step S4, if the movement amount of the second member 3 in the reverse direction is less than the specified value, as step S8, it is determined based on the output signal of the encoder 54 whether the movement amount (rotation amount) of the second member 3 in the movement direction is equal to or greater than the specified value. Accordingly, it is possible to determine the influence of the external force F (such as the force F2 shown in FIG. 8 or the force F3 shown in FIG. 10) in the movement direction on the drive of the piezoelectric driving apparatus 5. That is, the influence of the external force F on the driving of the piezoelectric driving apparatus 5 can be determined by step S4, S8. When the second member 3 moves in the movement direction by the specified value or more, as step S9, the drive of the piezoelectric driving apparatus 5 is stopped. This is because the external force F applied to the robot 1 is large and it is difficult to move the second member 3 to the target position in the second drive mode Dm2. On the other hand, when the moving amount of the second member 3 in the movement direction is less than the specified value, the process proceeds to step S7.

In step S7, in a case where the second member 3 reaches the target position, the drive of the piezoelectric driving apparatus 5 is stopped as step S10. As a result, the movement of the second member 3 to the target position ends normally. On the other hand, when the second member 3 has not reached the target position, it is determined in step S11 whether both the feed amplitude W1 and the separation amplitude W2 have reached the upper limit. If the second member 3 has not reached the target position, it can be considered that, due to the influence of the external force F in the opposite direction, the second member 3 is not moving in the movement direction or the moving speed thereof is reduced. Therefore, when both the feed amplitude W1 and the separation amplitude W2 have not reached the upper limit value, the determination in step S11 is repeated until both the feed amplitude W1 and the separation amplitude W2 reach the upper limit value, that is, until the drive force of the piezoelectric driving apparatus 5 becomes maximum. On the other hand, in a case where both the feed amplitude W1 and the separation amplitude W2 have reached the upper limits, it is not possible to expect a further increase in the drive force, and thus the process proceeds to step S9, and the drive of the piezoelectric driving apparatus 5 is stopped. Then, after drive of the piezoelectric driving apparatus 5 is stopped in step S9, an error message is issued in step S12 to notify the user that the operation has been stopped due to an abnormality.

According to such a controlling method, since the piezoelectric driving apparatus 5 is driven in the first drive mode Dm1 or the second drive mode Dm2 in which excellent minute movement control is possible, excellent minute movement control can be performed regardless of the presence or absence of external force F, and the second member 3 can be moved to the target position with higher accuracy. Further, when it is determined that it is difficult to move the second member 3 to the target position in the first drive mode Dm1 due to the influence of external force F, the drive algorithm is immediately switched to the second drive mode Dm2, which is capable of exerting a larger drive force than that in the first drive mode Dm1, so that the likelihood of receiving influence of the external force F is reduced. Therefore, according to such a controlling method, it is possible to reduce the influence of the external force F as much as possible and also accurately control minute movement of the robot 1.

The method of controlling the piezoelectric driving apparatus 5 has been described above. As described above, the method for controlling the piezoelectric driving apparatus 5, which includes the vibration section 511 that has the piezoelectric elements 51A to 51F and the transmission section 514 that transmits vibration of the vibration section 511 to the rotor 52, which is a driven body, and, by energization of the piezoelectric elements 51A to 51F, vibrates the vibration section 511 in a combination of longitudinal vibration and bending vibration to cause the transmission section 514 to perform an elliptical motion and to move the rotor 52 by the elliptical motion, the method of controlling the piezoelectric driving apparatus 5 including switching, according to an external force received by the rotor 52, a drive algorithm between the first drive mode Dm1 in which the separation amplitude W2, which is the amplitude of the longitudinal vibration, is changed while the feed amplitude W1, which is the amplitude of the bending vibration, is constant and the second drive mode Dm2 in which both the feed amplitude W1 and the separation amplitude W2 are changed. According to such a control method, it is possible to reduce the likelihood of influence from the external force F as much as possible and to accurately control minute movement of the piezoelectric driving apparatus 5.

In addition, as described above, the method of controlling the piezoelectric driving apparatus 5 includes step S2 of driving the piezoelectric actuator 51 in the first drive mode Dm1, and step S4 of determining the influence of the external force F and, based on the determination result, maintaining the drive algorithm in the first drive mode Dm1 or switching the drive algorithm to the second drive mode Dm2. Accordingly, a preferable drive mode can be selected, and the influence of the external force F can be reduced as much as possible.

As described above, when the influence of the external force F is larger than the reference value, the drive algorithm is switched to the second drive mode Dm2. By this, since a drive force larger than that in the first drive mode Dm1 can be obtained, the possibility that the second member 3 can be moved to the target position against the external force F is increased.

As described above, the influence of the external force F is determined based on the output signal of the encoder 54 that detects the displacement amount of the rotor 52. This makes the determination easy and accurate.

Further, as described above, in each of the first drive mode Dm1 and the second drive mode Dm2, the bending vibration is excited and then longitudinal vibration is excited. As a result, it becomes more difficult to be affected by the external force F, and more accurate minute movement control becomes possible.

As described above, the driven body is the rotor 52 that rotationally moves. This makes it easy to rotational move the second member 3 as the driven body.

In addition, as described above, the driven body may be the slider 55 that moves linearly. This makes it easy to linearly move the second member 3, as the driven body.

Further, as described above, the external force F is the force F1, F2 based on the restoring force of the wiring C. Since wiring C is provided in various mechanical devices to which the piezoelectric driving apparatus 5 can be applied, it is highly versatile controlling method.

Further, as described above, the external force F is the force F3 as gravity. Since the force F3 is normally applied to various mechanical devices to which the piezoelectric driving apparatus 5 can be applied except under a special environment, it is a highly versatile controlling method.

As described above, in the method of controlling the robot 1, the robot includes the piezoelectric driving apparatus 5 including the vibration section 511 that has the piezoelectric elements 51A to 51F and the transmission section 514 that transmits the vibration of the vibration section 511 to the rotor 52, which is the driven body. The piezoelectric driving apparatus 5, by energization of the piezoelectric elements 51A to 51F, vibrates the vibration section 511 in a combination of the longitudinal vibration and the bending vibration to cause the transmission section 514 to perform the elliptical motion, and moves the rotor 52 by the elliptical motion. Further, the robot 1 includes the second member 3 as a movable section driven by the piezoelectric driving apparatus 5. The controlling method of the robot switches, according to an external force F received by the rotor 52, the drive algorithm between the first drive mode Dm1 in which the separation amplitude W2, which is the amplitude of the longitudinal vibration, is increased while the feed amplitude W1, which is the amplitude of the bending vibration, is constant and the second drive mode Dm2 in which both the feed amplitude W1 and the separation amplitude W2 are changed. According to such a controlling method, it is possible to reduce the influence of the external force F as much as possible and to accurately control minute movement of the robot 1.

In addition, as described above, the robot 1 includes the piezoelectric driving apparatus 5 including the vibration section 511 that has the piezoelectric elements 51A to 51F and the transmission section 514 that transmits vibration of the vibration section 511 to the rotor 52 as the driven body, and, by energization of the piezoelectric elements 51A to 51F, vibrates the vibration section 511 in a combination of the longitudinal vibration and the bending vibration to cause the transmission section 514 to perform elliptical motion and to move the rotor 52 by the elliptical motion, the second member 3, which is a movable section, driven by the piezoelectric driving apparatus 5, and the controller 4 that controls drive of the piezoelectric driving apparatus 5. Also, the controller 4 switches, according to the external force F received by the rotor 52, the drive algorithm between the first drive mode Dm1 in which the separation amplitude W2, which is an amplitude of the longitudinal vibration, is changed while the feed amplitude W1, which is an amplitude of the bending vibration, is constant, and the second drive mode Dm2 in which both the feed amplitude W1 and the separation amplitude W2 are changed. According to such a controlling method, it is possible to reduce the influence of the external force F as much as possible and to accurately control minute movement of the robot 1.

Second Embodiment

Figure 14:
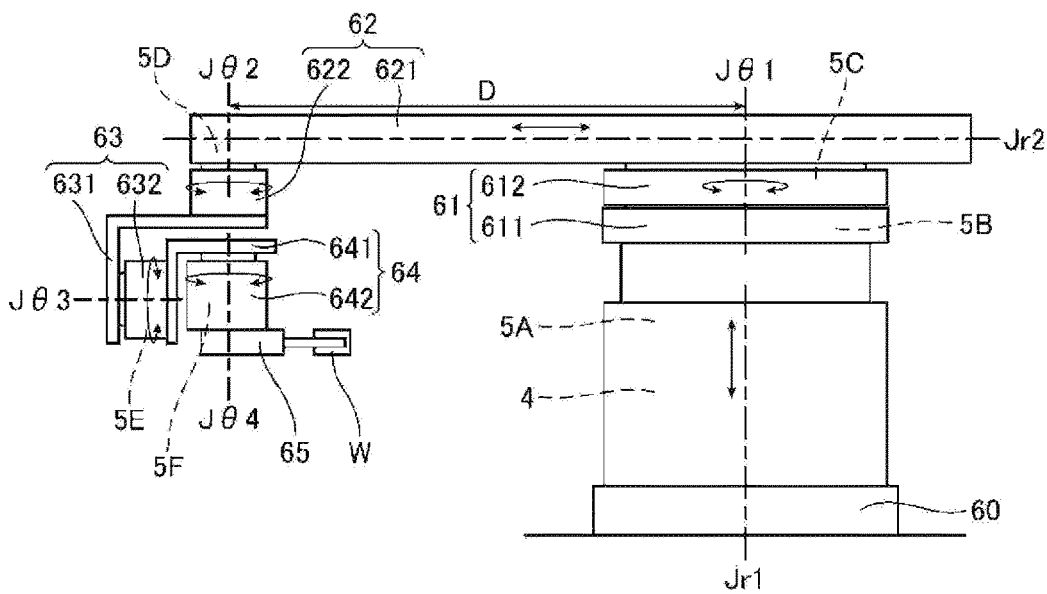
FIG. 14 is a diagram showing a robot according to a second embodiment.

FIG. 14 is a diagram showing a robot according to a second embodiment.

The robot 6 shown in FIG. 14 is a horizontal articulated robot (SCARA robot). The use of the robot 6 is not particularly limited, and examples thereof include supplying, removing, transporting, and assembling of objects such as precision devices and components constituting the precision devices.

The robot 6 includes a base 60 fixed to a floor or the like, a first arm 61 connected to the base 60, a second arm 62 connected to the first arm 61, a third arm 63 connected to the second arm 62, a fourth arm 64 connected to the third arm 63, and an end effector 65 connected to the fourth arm 64.

Further, the first arm 61 moves in the direction of a first linear motion axis Jr1 with respect to the base 60, and rotates around a first pivot axis Je1 parallel to the first linear motion axis Jr1. The second arm 62 moves with respect to the first arm 61 in a second linear motion axis Jr2 direction perpendicular to the first linear motion axis Jr1, and rotates about an second pivot axis Jθ2 parallel to the first pivot axis Jθ1. The third arm 63 rotates with respect to the second arm 62 about a third pivot axis Jθ3 perpendicular to the second pivot axis Jθ2. The fourth arm 64 rotates with respect to the third arm 63 about a fourth pivot axis Jθ4 perpendicular to the third pivot axis Jθ3. The robot 6 moves the end effector 65 to a target position and posture by a combination of the movement about the four pivot axes Jθ1, Jθ2, Jθ3, and Jθ4 and the movement in the directions of the two linear motion axes Jr1 and Jr2.

The first arm 61 includes a linear motion section 611 that is connected to the base 60 and moves in the direction of the first linear motion axis Jr1 with respect to the base 60, and a first rotation section 612 that is connected to the first linear motion section 611 and rotates about the first pivot axis Jθ1 with respect to the first linear motion section 611.

The second arm 62 includes an elongated second linear motion section 621 that is connected to the first rotation section 612 and that moves with respect to the first rotation section 612 in the direction of the second linear motion axis Jr2, and a second rotation section 622 that is connected to the front end portion of the second linear motion section 621 and that rotates with respect to the second linear motion section 621 around the second pivot axis Jθ2. The second linear motion axis Jr2 is orthogonal to the first pivot axis Jθ1 and rotates about the first pivot axis Jθ1 in accordance with rotation of the first rotation section 612 about the first pivot axis Jθ1. The second pivot axis Jθ2 is parallel to the first pivot axis Jθ1, and a separation distance D from the first pivot axis Jθ1 changes with the movement of the second linear motion section 621 in the direction of the second linear motion axis Jr2.

The third arm 63 includes an arm section 631 connected to the second rotation section 622, and a third rotation section 632 connected to the arm section 631 so as to be rotatable about the third pivot axis Jθ3. The arm section 631 has a substantially L-shape bent at a substantially right angle in the middle thereof, the second moving portion 622 is connected to the base end thereof, and the third rotation section 632 is connected to the front end portion thereof. The third pivot axis Jθ3 is orthogonal to the second pivot axis Jθ2, and rotates about the second pivot axis Jθ2 in accordance with the rotation of the second rotation section 622 about the second pivot axis Jθ2.

The fourth arm 64 includes an arm section 641 connected to the third rotation section 632, and a fourth rotation section 642 connected to the arm section 641 so as to be rotatable about the fourth pivot axis Jθ4. The arm section 641 has a substantially L-shape bent at a substantially right angle in the middle thereof, the third rotation section 632 is connected to the base end thereof, and the fourth rotation section 642 is connected to the front end portion thereof. The fourth pivot axis Jθ4 is orthogonal to the third pivot axis Jθ3, and rotates about the third pivot axis Jθ3 in accordance with the rotation of the third rotation section 632 about the third pivot axis Jθ3.

The end effector 65 is connected to the fourth rotation section 642. The end effector 65 is a mechanism for causing the robot 6 to perform a predetermined work, and may have any configuration such as a mechanism for holding a workpiece W, a mechanism for sucking a workpiece W, and a mechanism for applying an adhesive or the like to a workpiece W.

The robot 6 further includes a piezoelectric driving apparatus 5A that moves the first linear motion section 611 with respect to the base 60 in the direction of the first linear motion axis Jr1, a piezoelectric driving apparatus 5B that rotates the first rotation section 612 with respect to the first linear motion section 611 about the first pivot axis Jθ1, a piezoelectric driving apparatus 5C that moves the second linear motion section 621 with respect to the first rotation section 612 in the direction of the second linear motion axis Jr2, a piezoelectric driving apparatus 5D that rotates the second rotation section 622 with respect to the second linear motion section 621 about the second pivot axis Jθ2, a piezoelectric driving apparatus 5E that rotates the third rotation section 632 with respect to the second rotation section 622 about the third pivot axis Jθ3, a piezoelectric driving apparatus 5F that rotates the fourth rotation section 642 with respect to the third rotation section 632 about the fourth pivot axis Jθ4, and a controller 4 that independently controls each of the piezoelectric driving apparatuses 5A to 5F.

Among them, the piezoelectric driving apparatuses 5A and 5C are composed of the linear motion type piezoelectric driving apparatus shown in FIG. 3, and the piezoelectric driving apparatuses 5B, 5D, 5E, and 5F are composed of the rotation type piezoelectric driving apparatus shown in FIG. 2.

Although not shown, in the piezoelectric driving apparatus 5A, the linear motion axis Jr coincides the first linear motion axis Jr1, one of the piezoelectric actuator 51 and the slider 55 is fixed to the base 60, and the other is fixed to the first arm section 611. Therefore, the first arm 61 is moved in the direction of the first linear motion axis Jr1 with respect to the base 60 by the drive of the piezoelectric driving apparatus 5A. In the piezoelectric driving apparatus 5B, the pivot axis Jθ coincides the first pivot axis Jθ1, and one of the piezoelectric actuator 51 and the rotor 52 is fixed to the first linear motion section 611 and the other is fixed to the first rotation section 612. Therefore, the first rotation section 612 rotates about the first pivot axis Jθ1 with respect to the first linear motion section 611 by the drive of the piezoelectric driving apparatus 5B.

In the piezoelectric driving apparatus 5C, the linear motion axis Jr coincides with the second linear motion axis Jr2, one of the piezoelectric actuator 51 and the sliders 55 is fixed to the first rotation section 612, and the other is fixed to the second linear motion section 621. Therefore, the second linear motion section 621 is moved in the direction of the second linear motion axis Jr2 with respect to the first rotation section 612 by the drive of the piezoelectric driving apparatus 5C. In the piezoelectric driving apparatus 5D, the pivot axis Jθ coincides with the second pivot axis Jθ2, and one of the piezoelectric actuator 51 and the rotor 52 is fixed to the second linear motion section 621 and the other is fixed to the second rotation section 622. Therefore, the second rotation section 622 rotates about the second pivot axis Jθ2 with respect to the second linear motion section 621 by the drive of the piezoelectric driving apparatus 5D.

In the piezoelectric driving apparatus 5E, the pivot axis Jθ coincides with the third pivot axis Jθ3, and one of the piezoelectric actuator 51 and the rotor 52 is fixed to the arm section 631, and the other is fixed to the third rotation section 632. Therefore, the third rotation section 632 rotates around the third pivot axis Jθ3 with respect to the arm section 631 by the drive of the piezoelectric driving apparatus 5E. In the piezoelectric driving apparatus 5F, the pivot axis Jθ coincides with the fourth pivot axis Jθ4, one of the piezoelectric actuator 51 and the rotor 52 is fixed to the arm section 641, and the other is fixed to the fourth rotation section 642. Therefore, the fourth rotation section 642 rotates about the fourth pivot axis Jθ4 with respect to the arm section 641 by the drive of the piezoelectric driving apparatus 5F.

The robot 6 has been described above. In such a robot 6, the controlling method (hereinafter, also referred to as "present control method") described in the first embodiment described above can be applied to at least one of the piezoelectric driving apparatuses 5A to 5F. That is, it is possible to perform control to switch the drive algorithm between the first drive mode Dm1 and the second drive mode Dm2 according to the external force F received by the rotor 52 or the slider 55. As a result, it is possible to reduce the influence of the external force F as much as possible and to accurately control the minute movement of the robot 6. Which of the piezoelectric driving apparatuses 5A to 5F is to use the present control method can be appropriately determined based on, for example, the installation posture, the trajectory of motion, arrangement of wiring, and the like of the robot 6.

According to the second embodiment as described above, the same effects as those of the first embodiment described above can be exhibited. For any joint section where the present control method is not used, a driving device other than the piezoelectric driving apparatus, for example, a combination of an electromagnetic motor and a reduction gear, may be used.

Third Embodiment

Figure 15:
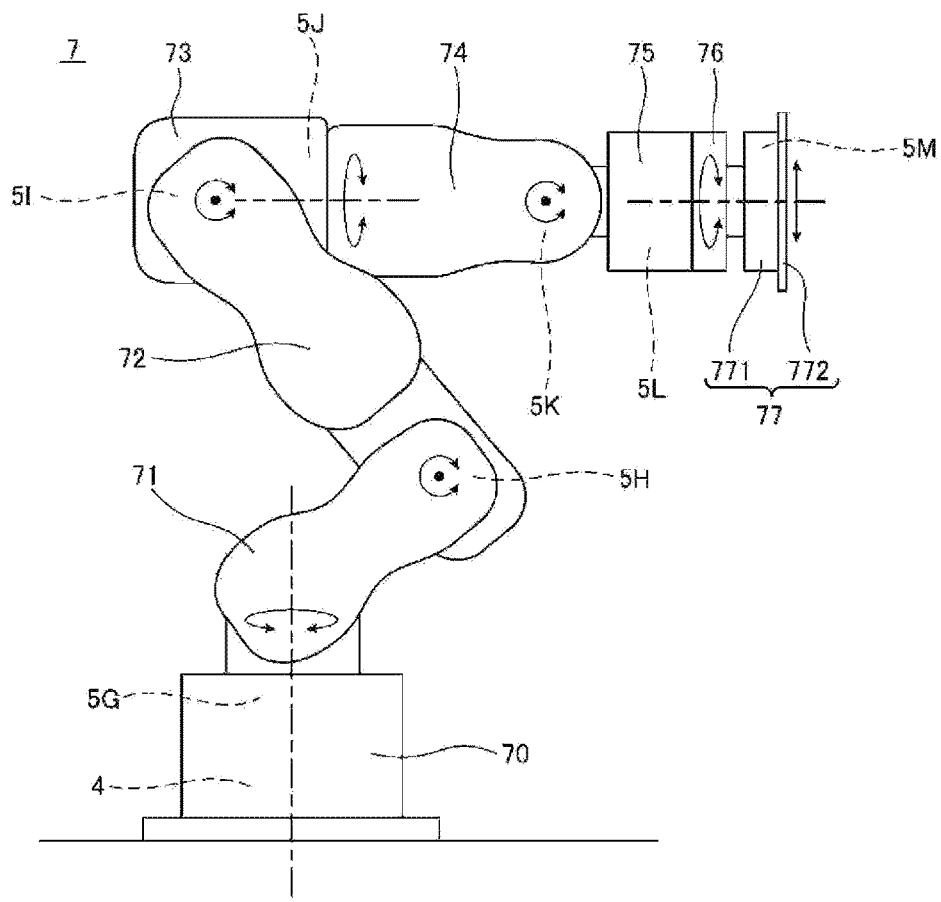
FIG. 15 is a diagram illustrating a robot according to a third embodiment.

FIG. 15 is a diagram showing a robot according to a third embodiment.

The robot 7 shown in FIG. 15 is a 6-axis robot having six drive axes. The robot 7 includes a base 70 fixed to a floor or the like, a first arm 71 rotatably connected to the base 70, a second arm 72 rotatably connected to the first arm 71, a third arm 73 rotatably connected to the second arm 72, a fourth arm 74 rotatably connected to the third arm 73, a fifth arm 75 rotatably connected to the fourth arm 74, a sixth arm 76 rotatably connected to the fifth arm 75, and an end effector 77 as a stage provided on a tip end side of the sixth arm 76. In addition, the end effector 77 includes a base section 771 fixed to the sixth arm 76, and a table section 772 linearly moving with respect to the base section 771.

The robot 7 includes a piezoelectric driving apparatus 5G that rotates the first arm 71 with respect to the base 70, a piezoelectric driving apparatus 5H that rotates the second arm 72 with respect to the first arm 71, a piezoelectric driving apparatus 5I that rotates the third arm 73 with respect to the second arm 72, a piezoelectric driving apparatus 5J that rotates the fourth arm 74 with respect to the third arm 73, a piezoelectric driving apparatus 5K that rotates the fifth arm 75 with respect to the fourth arm 74, a piezoelectric driving apparatus 5L that rotates the sixth arm 76 with respect to the fifth arm 75, a piezoelectric driving apparatus 5M that linearly moves the table section 772 with respect to the base section 771, and a controller 4 that independently controls each of the piezoelectric driving apparatuses 5G to 5M.

Among them, piezoelectric driving apparatuses 5G to 5L are constituted by the rotation type piezoelectric driving apparatus 5 shown in FIG. 2, and the piezoelectric driving apparatus 5M is constituted by the linear motion type piezoelectric driving apparatus 5 shown in FIG. 3.

The robot 7 has been described above. In such a robot 7, the present controlling method can be applied to at least one of the piezoelectric driving apparatuses 5G to 5M. That is, it is possible to control the drive algorithm to be switched between the first drive mode Dm1 and the second drive mode Dm2 according to the external force F received by the rotor 52 or the slider 55. This makes it possible to reduce the influence of the external force F as much as possible and to accurately control the minute movement of the robot 7. Which of the piezoelectric driving apparatuses 5G to 5M is to use the present controlling method can be appropriately determined based on, for example, the installation posture, trajectory of motion, arrangement of wiring, and the like of the robot 7.

According to the third embodiment as described above, the same effects as those of the first embodiment described above can be exhibited. For any joint section where the present control method is not used, a driving device other than the piezoelectric driving apparatus, for example, a combination of an electromagnetic motor and a reduction gear, may be used.

Although the method of controlling a piezoelectric driving apparatus, the method of controlling a robot, and the robot according to the present disclosure have been described above based on the illustrated embodiments, the present disclosure is not limited thereto, and the configuration of each section can be replaced with an arbitrary configuration having the same function. In addition, other arbitrary components may be added to the present disclosure. In addition, the method of controlling the piezoelectric driving apparatus may be applied to any device other than the robot.

What is claimed is:

1. A method of controlling a piezoelectric driving apparatus,
   the piezoelectric driving apparatus including a vibration section that has a piezoelectric element and a transmission section that transmits vibration of the vibration section to a driven body, and, by energization of the piezoelectric element, vibrates the vibration section in a combination of longitudinal vibration and bending vibration to cause the transmission section to perform an elliptical motion and to move the driven body by the elliptical motion,
   the method of controlling the piezoelectric driving apparatus comprising:
   switching, according to an external force received by the driven body, a drive algorithm of the piezoelectric driving apparatus between a first drive mode in which a separation amplitude, which is an amplitude of the longitudinal vibration, is changed while a feed amplitude, which is an amplitude of the bending vibration, is constant and a second drive mode in which both the feed amplitude and the separation amplitude are changed.

2. The method of controlling the piezoelectric driving apparatus according to claim 1, further comprising:
   a step of driving a piezoelectric actuator in the first drive mode and
   a step of determining influence of the external force and, based on the determination result, maintaining the drive algorithm in the first drive mode or switching the drive algorithm to the second drive mode.

3. The method of controlling the piezoelectric driving apparatus according to claim 2, wherein:
   when the influence of the external force is larger than a reference value, the drive algorithm is switched to the second drive mode.

4. The method of controlling the piezoelectric driving apparatus according to claim 2, wherein:
   the influence of the external force is determined based on an output signal of an encoder that detects a displacement amount of the driven body.

5. The method of controlling the piezoelectric driving apparatus according to claim 1, wherein:
   in each of the first drive mode and the second drive mode, the bending vibration is excited and then the longitudinal vibration is excited.

6. The method of controlling the piezoelectric driving apparatus according to claim 1, wherein:
   the driven body is a rotor that rotationally moves.

7. The method of controlling the piezoelectric driving apparatus according to claim 1, wherein:
   the driven body is a slider that moves linearly.

8. The method of controlling the piezoelectric driving apparatus according to claim 1, wherein:
   the external force is a force based on a restoring force of a wiring included in the piezoelectric driving apparatus.

9. The method of controlling the piezoelectric driving apparatus according to claim 1, wherein:
   the external force is gravity.

10. A method of controlling a robot, the robot including:
    a piezoelectric driving apparatus including a vibration section that has a piezoelectric element and a transmission section that transmits vibration of the vibration section to a driven body, and, by energization of the piezoelectric element, vibrates the vibration section in a combination of longitudinal vibration and bending vibration to cause the transmission section to perform an elliptical motion and to move the driven body by the elliptical motion and
    a movable section driven by the piezoelectric driving apparatus,
    the method of controlling the robot comprising:
    switching, according to an external force received by the driven body, a drive algorithm of the piezoelectric driving apparatus between a first drive mode in which a separation amplitude, which is an amplitude of the longitudinal vibration, is changed while a feed amplitude, which is an amplitude of the bending vibration, is constant and a second drive mode in which both the feed amplitude and the separation amplitude are changed.

11. A robot comprising:
    a piezoelectric driving apparatus including a vibration section that has a piezoelectric element and a transmission section that transmits vibration of the vibration section to a driven body, and, by energization of the piezoelectric element, vibrates the vibration section in a combination of longitudinal vibration and bending vibration to cause the transmission section to perform an elliptical motion and to move the driven body by the elliptical motion;
    a movable section driven by the piezoelectric driving apparatus; and
    a controller that controls drive of the piezoelectric driving apparatus, wherein:
    the controller switches, according to an external force received by the driven body, a drive algorithm of the piezoelectric driving apparatus between a first drive mode in which a separation amplitude, which is an amplitude of the longitudinal vibration, is changed while a feed amplitude, which is an amplitude of the bending vibration, is constant and a second drive mode in which both the feed amplitude and the separation amplitude are changed.

* * * * *